Jan. 22, 1963  A. J. TURCHI ETAL  3,074,167
AIR DRIVEN DENTAL DRILL WITH COLLET
Filed June 22, 1959  3 Sheets-Sheet 2

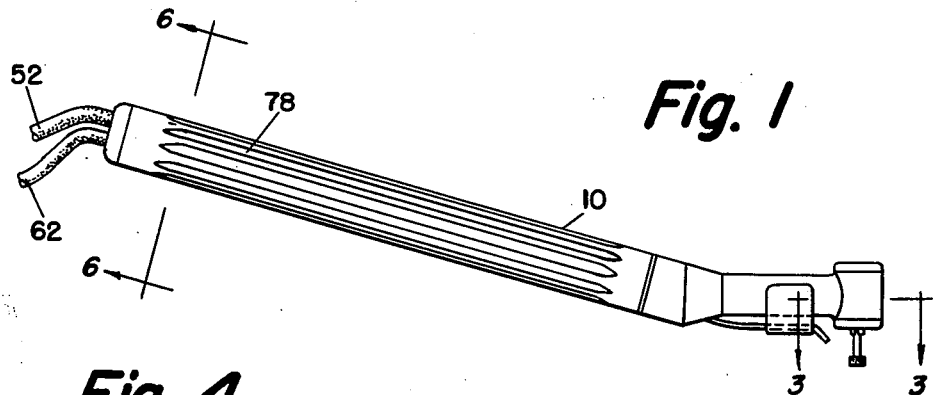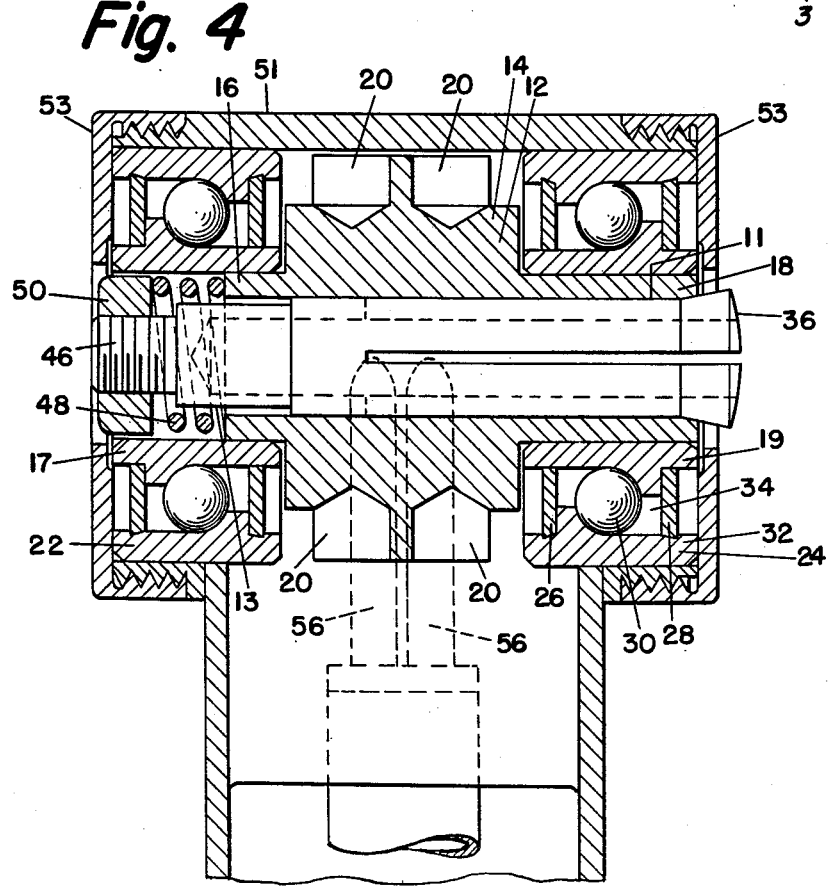

INVENTORS
ANTHONY J. TURCHI
NATHANIEL H. LIEB
BY
*Caesar and Rivise*
ATTORNEYS.

United States Patent Office 3,074,167
Patented Jan. 22, 1963

3,074,167
AIR DRIVEN DENTAL DRILL WITH COLLET
Anthony J. Turchi, Bala-Cynwyd, and Nathaniel H. Lieb, Philadelphia, Pa., assignors to Star Dental Manufacturing Co., Inc., Philadelphia, Pa., a corporation of Delaware
Filed June 22, 1959, Ser. No. 822,131
4 Claims. (Cl. 32—27)

This invention relates to a dental drill and has as an object the provision of a new and superior device of the class described.

It is known to supply the necessary rotative power to a dental bur by means of a round belt pulley system operatively connected to a source of power. Recently, the demands of high speed dentistry have necessitated the development of improved round belt systems and of flat belt pulley systems in order to effect a dental cutting tool speed of from 25,000 to 250,000 r.p.m. These pulley systems are costly, require maintenance and are an ever dangerous hazard should the dentist or patient be near by.

Moreover, the latest high speed dental techniques require that the rotating dental tool be safely secured to the rotary actuating means. It is known to use a threaded or latch chuck to accomplish the above purpose. Nevertheless these devices have proved to be unsatisfactory. These chucks cause inconvenience to the dentist in necessitating frequent changes of the cutting tools. Moreover, it is always possible that the holding means may be loosened by the action of the high speed tool.

Recently plastic or rubber sleeves have been employed as chuck means for dental cutting tools. These sleeves, however, wear out quickly and their holding power is an uncertainty.

It is therefore an object of the present invention to provide a means of driving the dental cutting tool at the necessary high speeds without the use of a pulley system.

It is a further object of the present invention to provide a motive member and a novel means for actuating said member which can directly supply the necessary motive power to a dental cutting tool.

Still another object of the present invention is to provide a novel chuck means which will safely secure a dental cutting tool at the necessary high speeds.

Still another object of the present invention is to provide a means for delivering a constant spray of air and water at the operating locus, said means being an integral part of the handpiece.

Other objects and many of the attendant advantages of this invention will be readily appreciated as the same becomes better understood by reference to the following detailed description when considered in connection with the accompanying drawings wherein:

FIG. 1 is a side elevational view of a device embodying the present invention with a dental bur fixedly attached in the operative position;

FIG. 4 is a sectional view taken along the lines 4—4 of FIG. 3;

Specific reference is now made to the drawings wherein like reference characters are used for like elements throughout.

Figure 5:
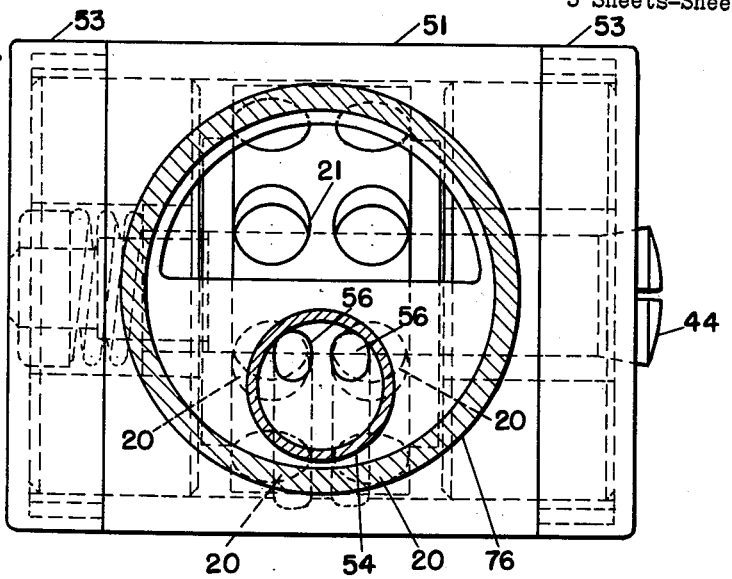
FIG. 5 is a sectional view taken along the lines 5—5 of FIG. 3.

The device is generally indicated at 10 in FIG. 1 and includes as shown in FIG. 4 a hollow, generally cylindrical rotor 12 having a bore 11, central body 14, a rearwardly projecting hub 16 and a longer frontwardly projecting hub 18. Central portion 14 possesses a plurality of taps 20 with air exit ports 21 upon its cylindrical face. As will be explained hereinafter, a source of air is forced into taps 20 thereby producing the desired rotation.

Frictionally fitted and adhesively secured to hubs 16 and 18 are the inner faces 17 and 19 of hollow, sealed, self lubricating ball bearings 22 and 24. As shown in FIG. 4, bearing 24 comprises rotatable inner race 19, sealing members 26 and 28, balls 30, fixed outer race 32 and lubricant space 34. Bearings 22 and 24 are of the conventional type and their specific details do not form a part of the present invention. Bearing 24 (inner races), as previously noted, is secured about hub 18. Bearing 24 (as shown in FIG. 4) is closely adjacent to but not adhered to a side of central portion 14 and is essentially coextensive with said hub.

Bearing 22 is secured around hub 16 adjacent to the other side of central portion 14, but is longer than hub 16 and therefore projects rearwardly of hub 16 to form a continuation 13 of bore 11 of rotor 12.

Figure 7:
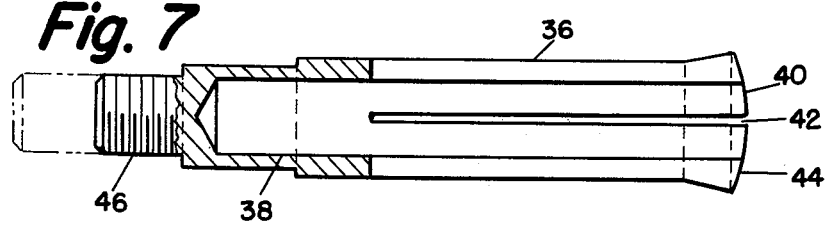
FIG. 7 is a side elevational view partly in section of an embodiment of the collet used in the present invention.

Mounted within the bore 11 and the continuation 13 is a collet or chuck means 36 as shown in FIGS. 4 and 7. Collet 36 is in part cylindrical in shape and includes an internal tap 38 which is adapted to receive the rearward portion of a dental bur. Collet 36 includes an expandable forward portion 40 and four slits 42 which extend rearwardly along the body of the collet 36 to jaws 44. When a clamping force is exerted on expandable portion 40, jaws 44 are compressed toward each other thereby exerting a positive clamping or chucking action upon the rearward portion of a dental bur inserted in tap 38.

Figure 8:
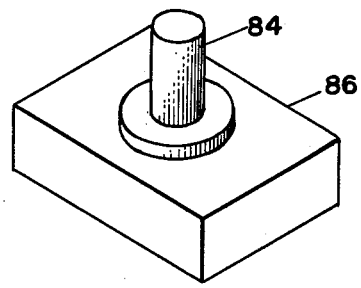
FIG. 8 is a perspective view of a mounting stand to be used in conjunction with the device of FIG. 1.

Collet 36 is frictionally mounted within the bore 11 of rotor 12 and bore 13 of bearing 22. Collet 36 extends rearwardly and has a threaded rear portion 46. Mounted over threaded portion 46 and within the bore 13 is a spring 48. Spring 48 is compressed by the bearing action of nut 50, threaded onto rear portion 46 and also substantially within the bore 13 in bearing 22. Thus when the nut 50 is forced against the projecting nob 84 of mounting stand 86 (FIG. 8), nut 50 is thereby forced against spring 48. Since collet 36 is rigidly attached to nut 50 and all other elements are held stationary within housing 51, collet 36 is forced frontwardly, thereby partially exposing the clamping jaws 44 of expendable portion 40. Thus as jaws 44 expand, a dental tool may be removed and new one inserted.

As soon as the force against nut 50 is removed, the compressive action of spring 48, which is biased against fixed hub 16 of rotor 12, is exerted against nut 50. Thus, the nut 50 is forced to return to its initial position thereby carrying collet 36 back to its initial position. The compressive forces encountered in the readaption of jaws 44 to the confines of the bore in rotor 12 cause the jaws 44 to close tightly about the new dental tool inserted into tap 38.

The entire unit including rotor, bearings, etc. is frictionally fitted within the confines of housing 51 with end caps 53 threaded thereon. Housing 51 merges into the remainder of the handpiece as will be explained hereinafter.

Figure 3:
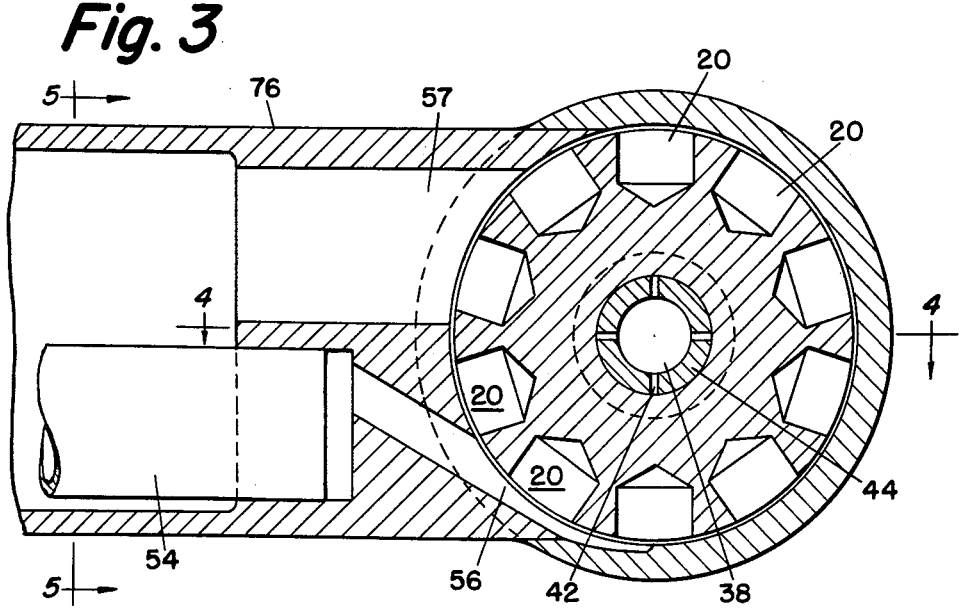
FIG. 3 is a fragmentary sectional view taken along the lines 3—3 of FIG. 1.

As previously discussed, the central portion 14 of rotor 12 possesses a plurality of taps 20 on its outer, otherwise cylindrical surface. The interaction of compressed air into taps 20 achieves the desired rotation of rotor 12. Compressed air is led through tubing 52 into smaller tubing 54, through a pair of slanted slits 56 and then is impelled tangentially across and into taps 20 (shown in FIG. 3). Such action moves rotor 12 in a counterclockwise direction when viewed as shown in FIG. 3. Thus, the neighboring taps 20 are then exposed to the impelled air thereby continuing and increasing the rotation of rotor 12. The air is exhausted through air exit ports 21 (FIG. 5).

Rotor 12 may be rotated at any desired speed dependent upon the thrust of the compressed air impelled across taps 20. The spent air is exhausted from exit port 21 and into space 57. The air is then led backwardly through handle 68 outside the tubes 54, 58 and 60 and through openings 59 and 59' in grommet 61 as shown in FIG. 6.

Rotor 12 possesses an outer diameter slightly less than the inner diameter of housing 51 and so is free to rotate therein. The outer diameter of bearings 16 and 18 is slightly larger than the outer diameter of rotor 12. Thus the outer races of bearings 16 and 18 are frictionally fitted within housing 51 and are thereby precluded from rotation with rotor 12. Since rotor 12 is adhesively joined to and frictionally fitted within the inner races of bearings 16 and 18, said inner races will rotate whenever rotor 12 rotates.

Figure 2:
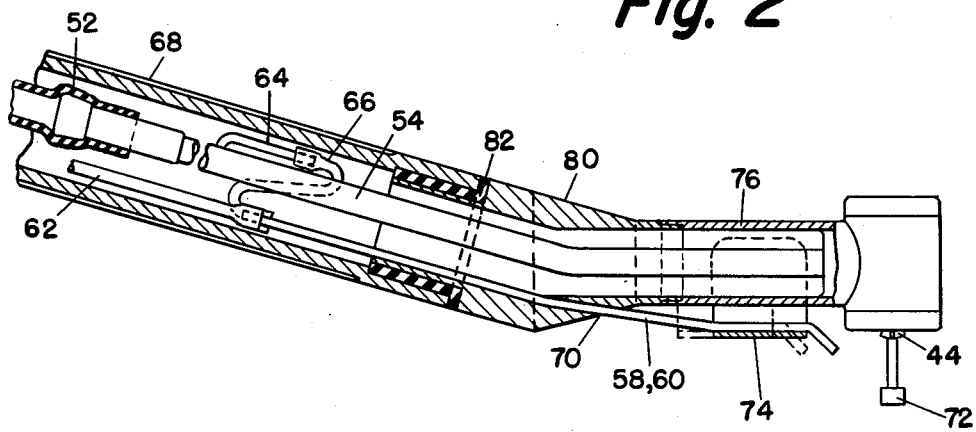
FIG. 2 is a fragmentary side view partly in section and partly in elevation of the device shown in FIG. 1.

Positioned on the underside of device 10 as shown in FIG. 2 are a pair of tubes 58 and 60 soldered to each other at a common edge. Tube 58 delivers water to the area of the tooth and rotating bur. A supply of water is led directly into tube 58 by tube 62. Air is led into air tube 60 from a tube 64 which is tapped into main air tube 54. Tubing 66 leads the air from tapped tube 64 into air tube 60. Parallel tubes 58 and 60 pass from the inside of handle 68 through a hole 70 in handle 68 and terminate near bur 72. Clip 74 extends about tubes 58 and 60 and is soldered thereto. Clip 74 extends about nozzle tube 76 and is releasably and adjustably clamped thereto. Thus, the dentist may adjust forwardly or backwardly the direction of the air-water mixture (created by intermingling at the discharge ends of tubes 58 and 60) by merely moving clip 74 along nozzle tube 76 as is shown by the phantom lines on FIG. 2.

Figure 6:
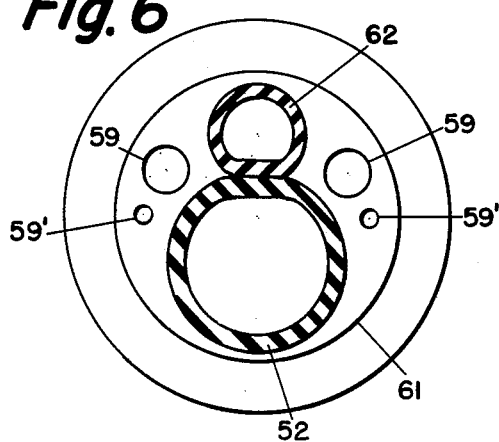
FIG. 6 is a sectional view taken along the lines 6—6 of FIG. 1.

Hollow handle 68 houses the leading ends of main air tube 52 and water tube 62 which enter handle 68 through grommet 61 as shown in FIG. 6. Handle 68 also houses connecting air tube 54, tapping tubes 64 and 66 and tubes 58 and 60 as shown in FIG. 2. Handle 68 may possess slots 78 for easy grasping. Handle 68 is joined with hollow angle tube 80 by rubber insert 82. Angle tube 80 is frictionally fitted to hollow nozzle tube 76 which in turn is soldered to housing 51 as shown in FIG. 2.

Obviously many modifications and variations of the present invention are possible in light of the above teachings. It is, therefore, to be understood that within the scope of the appended claims, the invention may be practiced otherwise than as specifically described.

What is claimed as the invention is:

1. In a dental handpiece having a rotary chuck, rotor means including a body portion, a forwardly projecting first hub and a rearwardly projecting second hub, said rotor means having a central bore extending therethrough, said body portion having a plurality of depressions formed on its outer surface, pneumatic means for conveying air to the depressions of said body portion to rotate said rotor, first and second bearing means respectively secured to said first and second hubs, said first and second bearing means including movable races secured to said rotor for rotation therewith, chuck means mounted in said central bore for rotation with said rotor, said chuck means having a longitudinal axis and including a rearward threaded stem and an expandable forward portion normally confined within said central bore and adapted to hold a tool, said rearward stem having spring means telescoped thereover which are biased against said second hub by a nut secured on said threaded stem, whereby said expandable portion of said chuck may be urged from said central bore by a thrust against said nut and whereby said expandable portion will be returned to said central bore by the expansion of said spring means against said nut when said thrust is removed, and an end cap rigidly secured to said handpiece, said end cap covering said nut and having an opening therein wherein an instrument may be inserted to cause the thrust against said nut.

2. The invention of claim 1 wherein said second hub is shorter than said first hub whereby said second bearing means projects behind said second hub to form a continuation of said central bore which houses said threaded stem, said spring means and said bearing means.

3. The invention of claim 1 and further including in combination compressed pressure fluid and liquid sources, means delivering jets of compressed pressure fluid and jet of liquid at an acute angle to said longitudinal axis of said chuck means and forward of said expandable jaws.

4. The invention of claim 3 wherein said means for delivering jets includes a pair of tubes attached to an adjustable clip adjustably mounted on a housing for said delivery means.

References Cited in the file of this patent
UNITED STATES PATENTS

| | | |
|---|---|---|
| 1,853,089 | Skinner | Apr. 12, 1932 |
| 2,420,338 | Page | May 13, 1947 |
| 2,897,596 | Maurer | Aug. 4, 1959 |